United States Patent [19]
Shiffler et al.

[11] Patent Number: 5,415,202
[45] Date of Patent: May 16, 1995

[54] MULTISTAGE VARIABLE AREA THROTTLE VALVE

[75] Inventors: Mark E. Shiffler, Annapolis; Joseph H. Morris, Queenstown, both of Md.

[73] Assignee: The United States of America as represented by the Secretary of the Navy, Washington, D.C.

[21] Appl. No.: 266,062

[22] Filed: Jun. 27, 1994

[51] Int. Cl.$^6$ .................................. F16K 1/36
[52] U.S. Cl. .................... 137/625.3; 137/625.33; 251/334; 251/902
[58] Field of Search ........... 137/625.28, 625.3, 625.33; 251/334, 902, 205

[56] References Cited

U.S. PATENT DOCUMENTS

| | | | |
|---|---|---|---|
| 181,288 | 8/1876 | Shaw | 251/902 |
| 2,369,005 | 2/1945 | Anschicks | 251/902 |
| 3,717,178 | 2/1973 | Allen | 251/902 X |
| 3,920,044 | 11/1975 | Gruner | 251/902 X |
| 4,858,644 | 8/1989 | Decker | 251/902 |

FOREIGN PATENT DOCUMENTS

| | | | |
|---|---|---|---|
| 61-124790 | of 0000 | Japan | 251/902 |
| 1302069 | of 0000 | U.S.S.R. | 251/902 |

Primary Examiner—Robert G. Nilson
Attorney, Agent, or Firm—Charles D. Miller

[57] ABSTRACT

A throttle or fluid control valve uses at least one compressible multi-wave washer as a fluid control element. The apertures formed by the multi-wave washer are short and of low aspect ratio when the valve is fully open to limit pressure drop across the valve, thus substantially preventing cavitation and flow-related noise to high flow velocities. As the valve is closed, the aspect ratio of the apertures increases but surfaces of the apertures remain angled to each other to provide noise cancellation and damping. Several multi-wave washers spaced by sliders are preferably used to further limit pressure drop in any stage and to form a serpentine path in the general direction of flow to provide further noise cancellation and damping. The sliders also enhance the self-purging action of the valve structure. A closure structure is also provided for assuring full closure of the valve.

12 Claims, 4 Drawing Sheets

MULTISTAGE VARIABLE AREA THROTTLE VALVE

DESCRIPTION

BACKGROUND OF THE INVENTION

1. Field of the Invention

The present invention generally relates to devices for the control of flow of liquids, gases or mixtures thereof in a fluid containing passage and, more particularly, to throttle valves presenting a controllably variable area to a flow of pressurized fluid.

2. Description of the Prior Art

Many arrangements are known which require control of the flow of a fluid, ranging from simple household water distribution systems to complex power plants and motive power systems and pneumatic or hydraulically operated controls for heavy machinery. Control of flow of either liquids or gases or mixtures thereof, such as in heat exchange systems, may be required. To achieve this control many types of valve of highly diverse geometries have been developed.

Many such applications of valves involve highly pressurized systems, often causing high velocities and large pressure drops across the valve or parts thereof, particularly when constricted. Such large pressure drops may cause vapors to form within a flowing liquid or cause entrained gases to separate from the fluid. This formation of gaseous phase within a liquid due to pressure change is referred to as cavitation.

Such cavitation places large and unpredictable forces on valve parts and may cause mechanical erosion of valve parts or the valve interior, requiring periodic maintenance. Further, cavitation can be a major source of objectionable noise due to fluid flow or pressure release. Depending on the pressure drop and the structure of the valve, cavitation noise can reach extremely high levels, often requiring acoustic treatment for control.

Some designs of so-called non-cavitating valves are known in the art. These designs generally involve numerous long, narrow passages for fluid flow. The control of fluid flow through such a valve is achieved by control of the number of such passages through which flow is permitted, often with a sliding gate or movable plug structure. However, cavitation is often not entirely prevented since a sliding gate will allow some of the fluid flow passages to be only partially opened and cavitation will usually occur therein.

Further, with such a type of valve geometry, the length and narrowness of the passages and the viscosity of the fluid limits the volume of flow relative to the overall dimensions of the valve and causes a significant "wide-open" pressure drop even at moderate flow velocities. By the same token, the fluid flow cross-sectional area is also relatively limited compared to the overall dimensions of the valve. Further, the narrowness of the passages makes them subject to partial or total blockage due to capture of contaminants and particulates which may be present in the fluid, thus also contributing to the need for periodic maintenance and unpredictable failure. Additionally, such valves must be highly precise and internal parts are typically provided as matched sets.

The use of springs of various forms in valve structures is known for a variety of purposes. For example, in Japanese Patent 61-124790, a helical spring is used to provide a load force against a valve plug to reduce vibration of parts. Helical springs are also known as a combined fluid control element and pressure sensor for pressure relief as in U.S. Pat. No. 2,369,005 and Soviet Union Patent SU-1302-069-A or for flow regulation as in U.S. Pat. No. 4,858,644. However, for full shut-off, treatment of the surface of the helical spring such as by coating with a resilient material is necessary. This treatment is subject to damage and wear and also requires periodic servicing by retreatment at significant expense and constitutes a failure mode of the valve if full shut-off is required. Additionally, the flow regime between coils of a helical spring is essentially that of a high aspect ratio duct which has little effect on prevention of cavitation and limits applications to low flow rate requirements and/or the maintaining of a substantial pressure drop across the valve, such as in the pressure relief applications mentioned above.

SUMMARY OF THE INVENTION

It is therefore an object of the present invention to provide a variable area fluid flow control throttle valve having improved resistance to production of cavitation and thereby of much reduced noise.

It is another object of the present invention to provide a valve which may be constructed of readily available parts and requires little, if any, maintenance.

It is a further object of the invention to provide a compact, non-cavitating throttle valve structure capable of maintaining a low pressure drop at high fluid flow rates.

It is yet another object of the invention to provide a compact, non-cavitating throttle valve having a large fluid flow cross-sectional area.

In order to accomplish these and other objects of the invention, a fluid control valve is provided including a generally cylindrical casing, a reciprocable shaft extending within the casing, at least one slider of a first type having a diameter to bear against an interior surface of the casing, at least one slider of a second type having an outer dimension which is smaller than the interior surface of said casing and further having an aperture sized to bear against the reciprocable shaft, and a compressible multi-wave washer positioned between the sliders to form a self purging and noise controlling flow control member.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
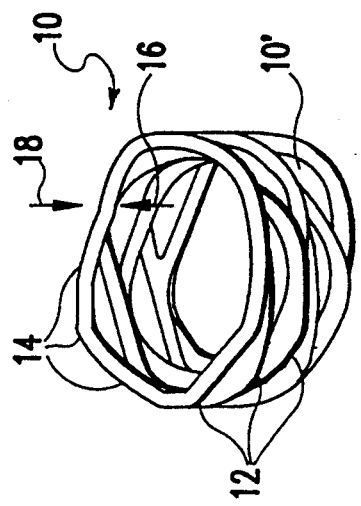
FIG. 1 is an isometric view of a multi-wave washer advantageously used in the invention.

Referring now to the drawings, and more particularly to FIG. 1, there is shown a known multi-wave washer 10 advantageously employed in the invention. Such a multi-wave washer is essentially comprised of a plurality of relatively thin annular layers 12, each layer being periodically bent (e.g. at 14) to form a wave-like shape along its periphery, from which the commonly known name of the washer derives. This form provides additional resilience in the direction of the thickness of the layer since the bent portions are flattened elastically when pressure is applied in that direction. Since the washer is thin, inelastic deformation does not occur prior to the washer being completely flattened by compressional force and the wave shape returns when the compressional force is reduced or released.

In a preferred form of multi-wave washer for use in the present invention, a plurality of annular layers 12, the number of which is not particularly important to the practice of the invention (six being shown in FIG. 1), are joined into a single unit by rotating one annular layer relative to the adjacent annular layer so that regions which are displaced in a first direction (e.g 16) relative to the axis of the washer (e.g. "raised") are in contact with regions of an adjacent washer which are displaced in a second direction (e.g. 18) relative to the axis of the washer (e.g. "depressed") and the contacting regions joined by adhesion, welding, spot-welding, brazing, soldering or other techniques not critical to the practice of the invention so long as the technique does not significantly affect the resilience of the annular layer 12 or degrade with flexure of the multi-wave washer. Thus, when uncompressed, the multi-wave washer provides a plurality of openings which are short in the radial direction, of low effective aspect ratio and tapered at the ends in the circumferential direction.

Figure 2:
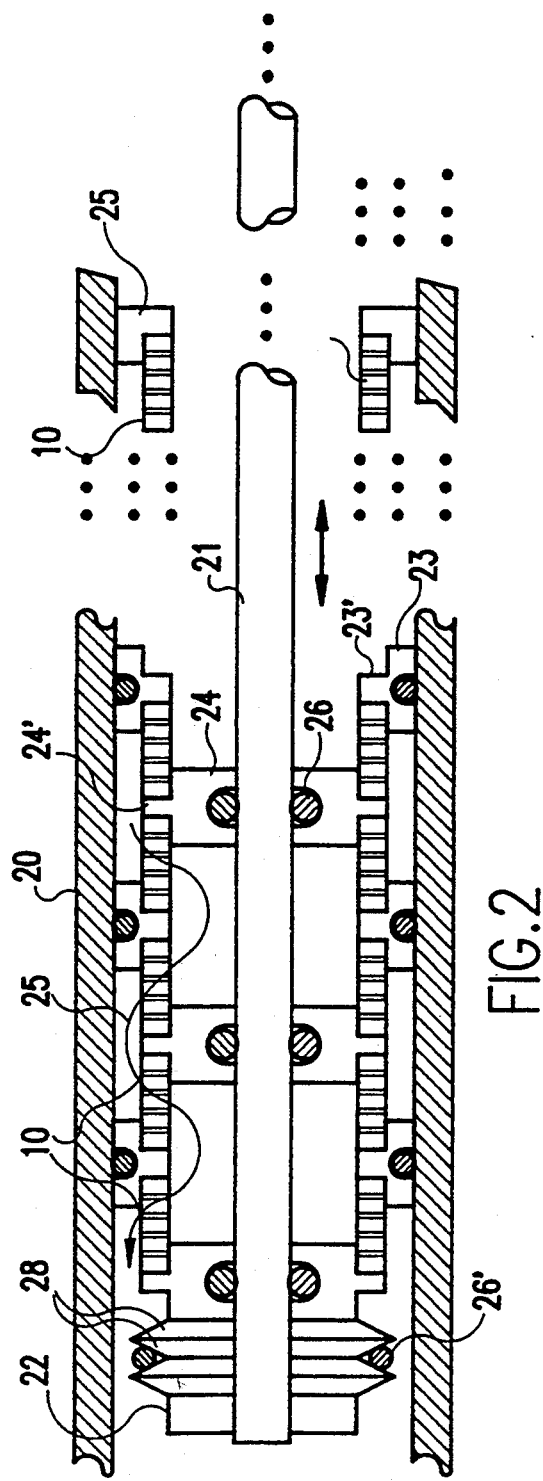
FIG. 2 is a cross-sectional view of an exemplary portion of the valve in accordance with the invention in an open position.

Referring now to FIG. 2, a valve in accordance with the invention is shown in longitudinal cross-section and in open position. The preferred flow direction is from right to left to limit actuation forces but the valve can operate with either direction of flow. The valve has a preferably cylindrical outer housing or casing 20 and is operated by means of a reciprocable shaft 21. The form of an actuator for reciprocating shaft 21 is not important to the invention and could be placed within the casing 20. If the actuator is placed outside the casing 20, shaft 21 can be brought through the casing with a seal of any of a plurality of known forms of seal which are capable of withstanding the anticipated system pressures.

At the end of shaft 21, a fastener such as a nut or circlip is provided in order to apply a compressional force to the valve parts against a fixed flange 25 at the opposite end of the valve structure when the valve is modulated or closed. Specifically, the internal valve structure basically comprises external sliders 23 which bear against the casing 20, and internal sliders 24 which bear against shaft 21. Both of these types of sliders are sealed against the casing or shaft by O-rings 26. The integrity of this seal does not significantly affect the operation of the invention since these elements function principally as baffles and it is sufficient that leakage be only relatively restricted. The O-rings or other forms of seal preferably are capable of providing the additional functions of acoustical damping of noise due to turbulence and limitation of vibration of the sliders against the shaft or the casing should such conditions occur. It should also be noted that the sliders are free to float on the shaft 21 under the influence of pressure within the valve so that if partial clogging of one or more of the multi-wave washers occurs, increase of pressure in that stage of the valve will cause the corresponding slider to move to allow expansion of the corresponding multi-wave washer. Such action will often allow release of the material clogging the multi-wave washer and may be a significant self-purging effect of the valve in accordance with the invention. At the same time, the same floating effect of sliders 23 and 24 dynamically equalizes pressure between all chambers of the valve and minimizes the possibility of onset of cavitation noise even when significant clogging is present.

Each of the sliders 23, 24 is provided with a flange 23', 24' which provides a seat for an end of a multi-wave washer 10, which is thus spaced from the wall of the casing and centrally positioned within the casing. Incidentally, the sliders should be sized at the washer seat in relation to the inside diameter of casing 20 and shaft 21 and the mean diameter of the multi-wave washer chosen such that the volumes of the galleries adjacent the casing and the shaft are of approximately equal flow areas to avoid accelerating and decelerating the fluid and increasing pressure drop across the valve.

This positioning of the multi-wave washer provides a fluid flow path through the valve which is generally serpentine in longitudinal cross-section, as shown by arrow 25. The openings formed by the multi-wave washers provide a plurality of short channels of low effective aspect ratio when the valve is open, limiting the pressure drop across the valve even at high fluid flow rates. Further, it should be appreciated that the tapered shape of openings 10' (FIG. 1) in the multi-wave provides a large number of acoustically reflective surfaces but which are angled to each other and variably spaced (due to the tapered ends of the openings therein). This geometry provides a high degree of cancellation of any pressure waves which may occur within the valve, much in the same manner as angled surfaces generally provided in anechoic chambers. This effect is believed to be enhanced by the serpentine flow path provided by the valve which tends to contain acoustic pressure waves at each stage (e.g. at each pair of adjacent multi-wave washers 10) of the valve. Additionally, it is believed that some noise cancellation will occur between the chambers (e.g. adjacent the shaft 21 and casing 20, respectively) formed on either side of the multi-wave washers.

It should also be appreciated that the short passage length, the relatively large area and the high effective aspect ratio of the openings in the multi-wave washers allow for a potentially very low pressure drop across each multi-wave washer, as noted above, tending to minimize the production of cavitation noise. The pressure drop across each stage may be further limited by providing as many stages as may be desired and, in practice, it has been found that relatively few stages such as the five stages illustrated in FIGS. 2 and 3 virtually eliminates the production of cavitation noise within the valve even for pressures encountered in large hydraulic systems. Further, as will be seen by a comparison of FIG. 3 with FIG. 2, as the valve is modulated or closed, the aspect ratio of the openings in the multi-wave washers is increased and the resistance to flow due to fluid viscosity augments the resistance to flow due to change of cross-sectional area which is also believed to augment damping of flow related noise. It is also believed that the change of shape of the openings in the multi-wave washers as the valve is modulated or closed reduces the tendency of the valve to clog with particulates in the fluid and the flexure of the annular layers 12 (FIG. 1) provides a self-purging function in the valve constructed in accordance with the invention.

Figure 3:
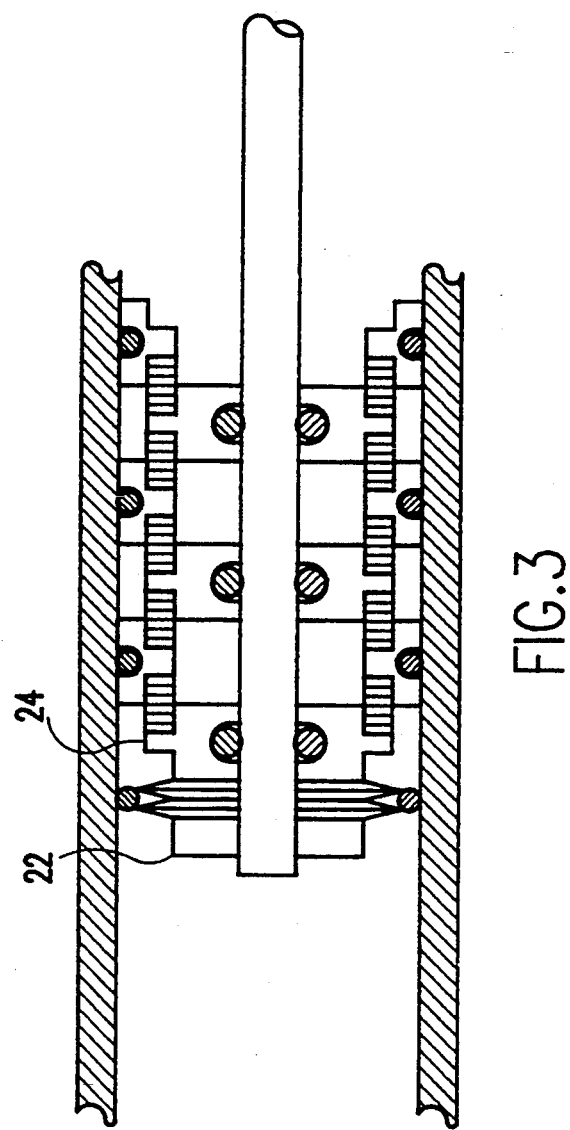
FIG. 3 is a cross-sectional view of an exemplary portion of the valve in accordance with the invention in an closed position.

Although not necessary to the practice of the invention, it is preferred, in this regard to establish the seats for the multi-layer washers in sliders 23 and 24 and stationary element 25 relative to the number and thickness of the annular layers 12 in the multi-wave washers 10 such that, when the valve is fully closed, the faces of the sliders 23, 24 (and stationary element 25) are at least coplanar, as shown in FIG. 3, or overlap slightly. While this reduces the opening area of the multi-wave washers through which flow may occur, some additional sealing effect is produced when the valve is fully closed since the entire cross-section (perpendicular to shaft 21) of the casing 20 will be filled with sliders and multi-wave washers if the seats for the latter are sized to provide a close fit. Two such closures may be formed for each stage provided in the valve and a significant sealing effect can be produced. This also halves the pressure carried by each such closure and further reduces noise as the valve is operated near the fully closed position.

It has been found in practice that while a valve constructed with only sliders can be fully closed, the bends 14 (FIG. 1) formed in the annular layers 12 often require substantial increase in compressional force to achieve full closure. Further, even though the valve is largely self-purging, as indicated above, particulates may become trapped between annular layers 12 and prevent full closure of the valve (or cause leakage when closed). Therefore, it is considered preferable to provide an additional closure mechanism at the end of shaft 21 as will now be described. In theory, such a closure mechanism could be placed at any location along the shaft 21 or even multiplied as desired. However, if only one such closure mechanism is provided, it is preferable that it be placed at the outlet side of the valve. It has been found that such a closure mechanism greatly reduces the force which must be applied to shaft 21 to achieve full closure of the valve.

The preferred closure mechanism consists of an even number of conical washers 28, often referred to as belleville washers, which are flattened as compressional force is applied thereto. An O-ring 26' is positioned between pairs of conical washers which are positioned in a facing relationship such that a groove is formed to retain the O-ring. As the valve is closed, the O-ring, which normally has a relatively low degree of compressibility and a relatively high elasticity in tension, will be forced outward until it contacts and is pressed against the inner walls of casing 20, as shown in FIG. 3. It is desirable that the conical washers have a height (e.g. in the direction of the length of shaft 21) of slightly more than half the thickness of the O-ring 26', allowing the O-ring to become fully recessed within (and preferably precisely to) the outside diameters of the conical washers 28, in order to maximize the flow cross-section when the valve is open and to provide as smooth a surface to the fluid flow as possible. It is preferable that he spring constant of the conical belleville washers be at least equal to or greater than the spring constant of the multi-wave washers to prevent closure of the valve by the O-ring 26' before flow rate through the multi-wave washers 10 is minimized. It is particularly advantageous in this regard, particularly if the flow direction is from left to right in FIG. 2, that the spring constant be greater than the spring constant of the multi-wave washers to assure that the O-ring closure arrangement is the last part of the valve to close.

It is also possible, but not necessary to the practice of the invention to provide an O-ring 26' which has a non-circular cross section (such as an inward-facing wedge or flange). Such a non-circular cross-section may also enhance retention between thee conical washers when the valve is operated to and from the fully closed position and the O-ring is maximally extended beyond the circumference of the conical washers 28.

Figure 4A:
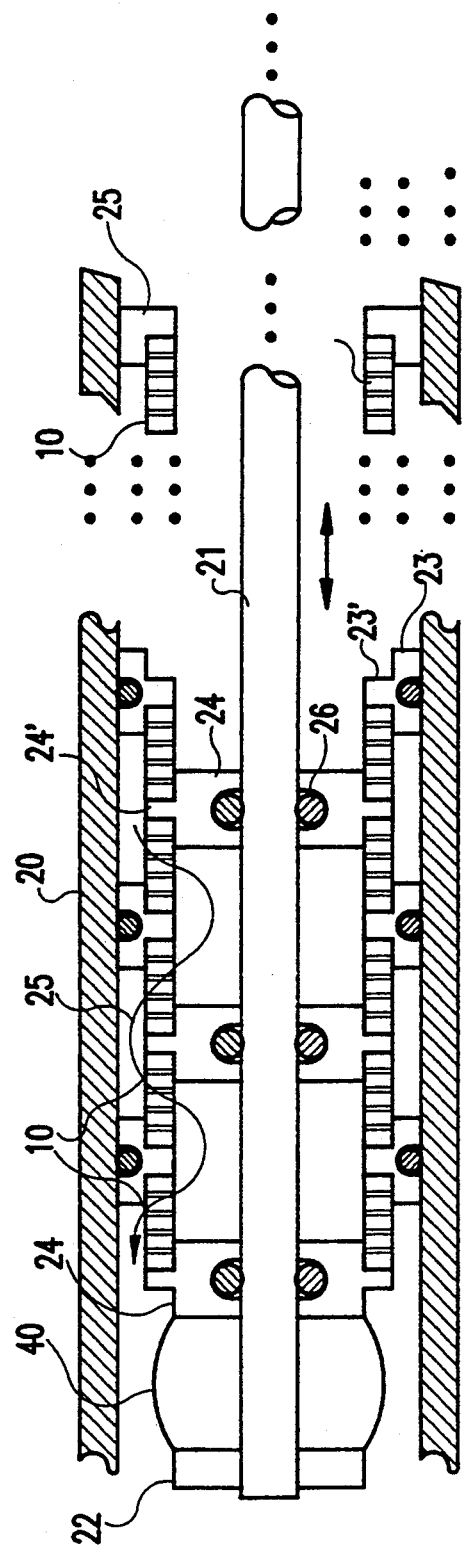
FIGS. 4A and 4B are a cross-sectional view of a variant form of the seal portion of the valve in open and closed positions respectively.
Figure 4B:
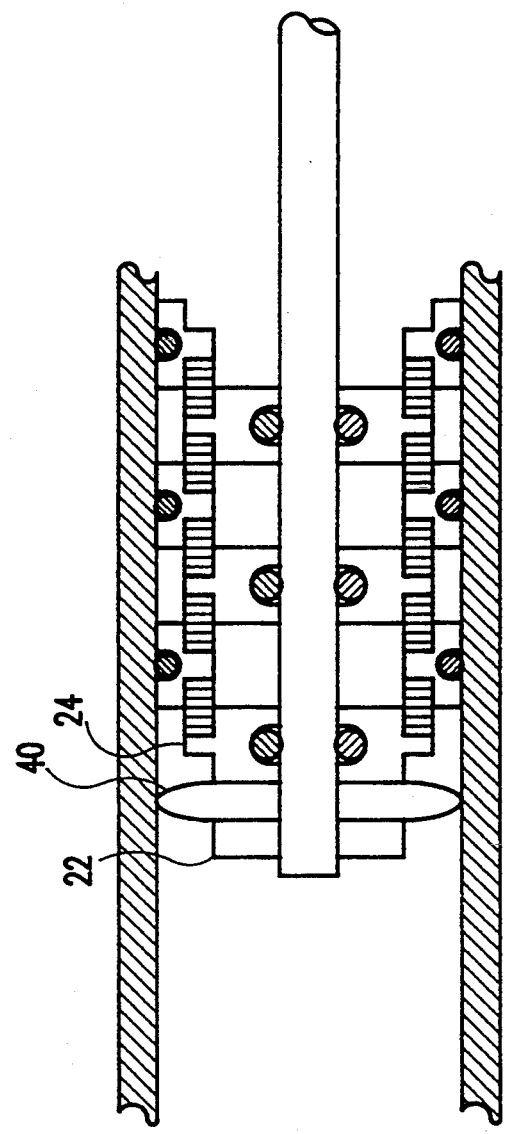

Referring now to FIGS. 4A and 4B, a variation of the invention will now be explained. FIGS. 4A and 4B differ from FIGS. 2 and 3, respectively, only by the substitution of one or more resilient elastomeric elements 40 for the conical washers 28 and O-ring 26'. Accordingly, reference numerals used in FIGS. 2 and 3 are also used in FIGS. 4A and 4B and elements common to both embodiments of the invention need not be further discussed.

In this variation of the invention, when the valve is open, the elastomeric element 40 has a generally cylindrical or barrel-shaped outer periphery which presents a smooth surface to the fluid flow. When the valve is closed, the elastomeric element 40 is flattened and the circumference thereof expands against the walls of casing 20 to provide full closure of the valve with reduced actuation force, as in the embodiment of FIGS. 2 and 3. The function of this variation of the invention is not significantly different from the closure arrangement of FIGS. 2 and 3, but the smoother surface presented to the flow when the valve is open makes the variant form of the invention shown in FIGS. 4A and 4B slightly preferable for high flow velocity applications. This type of closure is also more securely retained on the valve shaft 21 than O-ring 26' of circular cross-section. In view of these preferred forms of valve closure arrangement, other suitable forms of closure element will be evident to those skilled in the art.

In view of the foregoing, it is readily seen that the invention provides a valve structure having low cavitation, if any, and substantially reduced noise due to fluid flow therethrough while being capable of construction with low cost, low tolerance and off-the-shelf hardware components. The valve is largely self-cleaning and contaminant insensitive, requires no surface treatment of internal parts to reduce noise levels and can be operated with any type of actuator.

While the invention has been described in terms of a single preferred embodiment, those skilled in the art will recognize that the invention can be practiced with modification within the spirit and scope of the appended claims. For example, the structure of the valve and its principles of operation are entirely independent of the materials from which various parts are fabricated and, by proper choice of materials, the valve can be made to operate in any environment. Further, by varying the size of the valve tube or casing 20, the size of the valve stem or shaft 21, and the number of waves and annular layers in the multi-wave washers (e.g. length/open area) the valve flow coefficient can be established to answer virtually any requirements of any system where a low noise valve may be desirable.

Having thus described my invention, what we claim as new and desire to secure by Letters Patent is as follows:

1. A fluid control valve including
 a generally cylindrical casing,
 a reciprocable shaft extending within said casing,
 at least one slider of a first type having a diameter to bear against an interior surface of said casing, at least one slider of a second type having an outer dimension which is smaller than said interior surface of said casing and further having an aperture sized to bear against said reciprocable shaft, and a compressible multi-wave washer positioned between a said slider of said first type and a said slider of said second type.

2. A valve as recited in claim 1, further including a closure means for stopping fluid flow when said valve is in the fully closed position.

3. A valve as recited in claim 2, wherein said closure means includes at least one pair of compressible conical washers located on said reciprocable shaft and positioned to form a groove therebetween, and a sealing member located in said groove.

4. A valve as recited in claim 3, wherein said sealing member is an O-ring.

5. A valve as recited in claim 3, wherein said sealing member is of circular cross-section.

6. A valve as recited in claim 2, wherein said closure means includes a generally cylindrically shaped elastomeric member located on said reciprocable shaft.

7. A valve as recited in claim 2, wherein said closure means includes a generally barrel-shaped elastomeric member located on said reciprocable shaft.

8. A valve as recited in claim 1, having at least two said sliders of said second type and a slider of said first type positioned therebetween to form a serpentine path through said casing.

9. A valve as recited in claim 1, wherein at least one said slider of said first type includes mean for forming a seal against said interior surface of said casing.

10. A valve as recited in claim 1, wherein at least one said slider of said second type includes mean for forming a seal against said reciprocable shaft.

11. A valve as recited in claim 1, wherein said at least one slider of said first type and said at least one slider of said second type are each formed with a seat to receive said multi-wave washer.

12. A valve as recited in claim 11, wherein said seat for said multi-wave washer is of a height of approximately one-half the thickness of said multi-wave washer when said multi-wave washer is fully compressed.

* * * * *